(12) United States Patent
Vellore Ramesh et al.

(10) Patent No.: US 12,014,056 B2
(45) Date of Patent: Jun. 18, 2024

(54) SLICE FILE RECOVERY USING DEAD REPLICA SLICE FILES

(71) Applicant: NetApp Inc., San Jose, CA (US)

(72) Inventors: Bharadwaj Vellore Ramesh, Sunnyvale, CA (US); Daniel McCarthy, Erie, CO (US); Christopher Lee Cason, Boulder, CO (US); Ananthan Subramanian, San Ramon, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/893,511

(22) Filed: Aug. 23, 2022

(65) Prior Publication Data

US 2024/0069743 A1 Feb. 29, 2024

(51) Int. Cl.
G06F 3/06 (2006.01)

(52) U.S. Cl.
CPC ............ *G06F 3/0619* (2013.01); *G06F 3/064* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 7,739,233 | B1* | 6/2010 | Ghemawat | H04L 67/1095 707/633 |
| 9,003,227 | B1* | 4/2015 | Patel | G06F 11/165 714/6.1 |
| 9,558,068 | B1* | 1/2017 | Bono | G06F 11/1435 |
| 9,720,620 | B1* | 8/2017 | Wei | G06F 3/067 |
| 2006/0129612 | A1* | 6/2006 | MacCormick | G06F 11/1471 |
| 2011/0154041 | A1* | 6/2011 | Godfrey | H04W 12/033 713/171 |
| 2014/0365823 | A1* | 12/2014 | Michihata | G06F 11/1469 714/16 |
| 2020/0278984 | A1* | 9/2020 | Kaushik | G06F 11/2076 |

OTHER PUBLICATIONS

Yang Wang, et al.; Gnothi: Separating Data and Metadata for Efficient and Available Storage Replication; 12 Pgs.
NetApp Element 11.0; API Reference Guide; Nov. 2018; 536 Pgs.
(Continued)

*Primary Examiner* — Tracy C Chan
(74) *Attorney, Agent, or Firm* — Cooper Legal Group, LLC

(57) ABSTRACT

Techniques are provided for repairing a primary slice file, affected by a storage device error, by using one or more dead replica slice files. The primary slice file is used by a node of a distributed storage architecture as an indirection layer between storage containers (e.g., a volume or LUN) and physical storage where data is physically stored. To improve resiliency of the distributed storage architecture, changes to the primary slice file are replicated to replica slice files hosted by other nodes. If a replica slice file falls out of sync with the primary slice file, then the replica slice file is considered dead (out of sync) and could potentially comprise stale data. If a storage device error affects blocks storing data of the primary slice file, then the techniques provided herein can repair the primary slice file using non-stale data from one or more dead replica slice files.

20 Claims, 16 Drawing Sheets

(56) References Cited

OTHER PUBLICATIONS

Portworx; Amazon web services; Using EBS with Auto Scaling Groups; How to use the immense power of AWS Auto-Scaling Groups for a stateful Docker application; 31 Pgs.
Astra by NetApp—Astra Family; Application data protection, mobility and storage for cloud native applications; 8 Pgs.
NetApp; Astra Control Service documentation; Astra Control Service; Aug. 10, 2022; 114 Pgs.
NetApp; Astra Trident 22.07 documentation; Astra Trident; Aug. 12, 2022; 283 Pgs.
IBM Cloud; Containerization; Jun. 23, 2021; 14 Pgs.
NetApp; Get started; Astra Data Store; Jul. 25, 2022; 41 Pgs.
Google Kubernetes Engine: Ultimate Quick Start Guide; Jul. 10, 2021; What is Google Kubernetes Engine (GKE)?; 9 Pgs.
How to use AWS Auto-Scaling Groups (ASG) with stateful Docker containers; May 22, 2017; 12 Pgs.
Production-Grade Container Orchestration; Kubernetes; 6 Pgs.
NetApp; ONTAP 9 Documentation; Aug. 18, 2022; 2712 Pgs.
Stateful apps on Kubernetes get a big boost with Astra Data Store; The story of stateful applications on Kubernetes; Oct. 12, 2021; 4 Pgs.
The key pillars of the Astra Data Store architecture; Apr. 13, 2022; 5 Pgs.

\* cited by examiner

SLICE FILE RECOVERY USING DEAD REPLICA SLICE FILES

TECHNICAL FIELD

Various embodiments of the present technology relate to recovering from storage device errors. More specifically, some embodiments relate to repairing a primary slice file that has experienced data corruption from a storage device error.

BACKGROUND

A storage architecture provides clients with access to storage through volumes, LUNs, or other storage containers. The storage containers are created by the storage architecture using available storage resources of storage devices maintained by the storage architecture. The storage architecture manages the physical storage and organization of data within the physical storage devices on behalf of the clients. In particular, the storage architecture may create and host a LUN using available storage resources of one or more storage devices. The storage architecture may provide a client with access to the LUN so that the client can store and access data within the LUN. The LUN has logical blocks (e.g., 4 kb logical blocks) that are identified using logical block addresses. If a logical block is in use and storing data, then the logical block is assigned a block identifier. The block identifier can be used to identify a block within a storage device that is physically storing the data of the logical block. In this way, the client does not need to understand or manage how data is being stored within the storage devices because the storage architecture manages how the data is physically stored within the storage devices. This provides the client with a simple and easy way to store data through the LUN, a volume, or other storage container without having to understand how and where the data is physically stored or organized.

DESCRIPTION OF THE DRAWINGS

Embodiments of the present technology will be described and explained through the use of the accompanying drawings in which.

Figure 1:
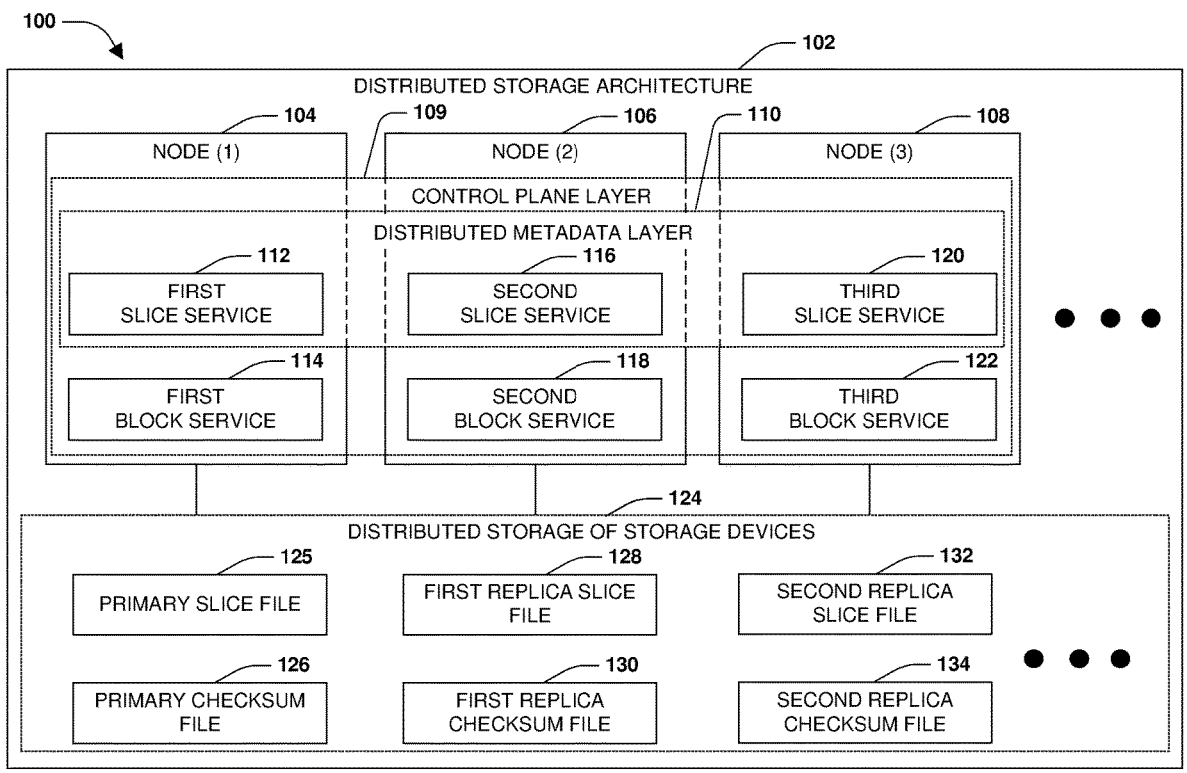
FIG. 1 is a block diagram illustrating an example of a distributed storage architecture within which a distributed metadata layer is hosted in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to repairing a primary slice file that has experienced data corruption from a storage device error. More specifically, some embodiments relate to repairing the primary slice file using one or more dead replica slice files that are out of sync with the primary slice file. A distributed storage architecture provides clients with the ability to store data within distributed storage. The distributed storage is managed by nodes that processes client I/O operations directed to the distributed storage. The nodes process the client I/O operations to store data within or retrieve data from storage devices of the distributed storage. The nodes of the distributed storage architecture abstract away from clients the details of how client data is physically stored within the storage devices of the distributed storage. Instead, the clients are able to view and access client data through volumes, LUNs, and/or other storage containers.

The distributed storage architecture implements a distributed metadata layer that utilizes slice files as indirection layers between the storage containers and the physical storage. A slice service hosted by a node of the distributed storage architecture populates a slice file with mappings that can be used to locate data stored within the distributed storage. A client request for data of a logical block may include a logical block address. The slice service uses the logical block address as a lookup into the slice file in order to identify a mapping that maps the logical block address to a block identifier that can be used to identify a block within a storage device of the distributed storage that stores the data of the logical block. In this way, the node can retrieve the data from the block within the storage device of the distributed storage, and can execute the request upon the data within the block.

The slice file may be designated as a primary slice file that is the authoritative copy of mappings between logical block addresses of a storage container and block identifiers. With being authoritative copy of mappings, the primary slice file is kept up-to-date by the slice service as I/O operations are executed upon the storage container by the node. In particular, when an I/O operation is received by the node from a client, the I/O operation is executed by the node and any changes to the mappings within the primary slice file resulting from the execution of the I/O operation are made by the slice service to the primary slice file. The slice service updates the primary slice file before the node provides a success response back to the client for the I/O operation.

While the primary slice file is the authoritative copy of mappings, other replica slice files may be maintained by other nodes of the distributed storage architecture as replicas of the primary slice file for improved resiliency to failures. These replica slice files are not the authoritative copy of the mappings between the logical block addresses of the storage container and the block identifiers. Instead, the replica slice files are maintained as redundant replicas of the primary slice file so that if the primary slice file becomes corrupt or lost, then a replica slice file can be used to rebuild the primary slice file or become a new primary slice file. Changes that are made to the primary slice file of the node are replicated to the replica slice files, which may be maintained at other nodes within the distributed storage architecture for failure resiliency. If the changes are being synchronously replicated to a replica slice file such that the replica slice file is up-to-date and mirrors the primary slice file, then the replica slice file is a live replica slice file. Because the live replica slice file mirrors the primary slice file and has the most up-to-date mappings, the live replica slice file can be used to repair or replace the primary slice file.

A live replica slice file can become out-of-sync with the primary slice file for various reasons. The live replica slice file can become out-of-sync if the node hosting the primary slice file fails to replicate a change made to the primary slice file to a node hosting the live replica slice file. Failure to replicate the change can occur because of a network outage, a temporary network transmission failure, a failure of the node hosting the live replica slice file, etc. In response to a failure to replicate the change, the live replica slice file is designated as being a dead replica slice file. The live replica slice file may be designated as being the dead replica slice file by updating status metadata maintained by the distributed metadata layer for tracking that status of slice files maintained by slice services of nodes within the distributed storage architecture. Once the live replica slice file is designated as the dead replica slice file, the node hosting the primary slice file is no longer required to replicate changes made to the primary slice file to the dead replica slice file. In this way, the primary slice file will diverge from the dead replica slice file over time. Thus, some mappings within the dead replica slice file could stay up-to-date, while other mappings become out-of-date and stale due to the divergence.

Data of the primary slice file is stored within blocks of one or more storage devices within the distributed storage. These storage devices can be susceptible to storage device errors, which can cause data loss or data corruption of data stored within the blocks. If any of the blocks storing data of the primary slice file are affected by a storage device error, then the primary slice file could comprise incorrect or incomplete data, and thus the primary slice file must be repaired. The primary slice file can be repaired or replaced if there is at least one live replica slice file because the live replica slice files are maintained as synchronously mirrored copies/replicas of the primary slice file.

Unfortunately, if there are no live replica slice files and there are only dead replica slice files, then the primary slice file cannot be recovered using conventional repair techniques because the dead replica slice files have diverged from the primary slice file and some data is or could be stale compared to corresponding data in the primary slice file. If there are no live replica slice files, then manual attempts can be performed to attempt to salvage at least some of the primary slice file. If any of the primary slice file can be salvaged (e.g., recovering data of the primary slice file that is stored in blocks not affected by the storage device error), then a client can be notified of the salvaged portion to see if the salvaged portion is adequate enough to continue operation. The manual attempts to salvage the primary slice file will not be able to fully repair or recover the primary slice file, thus resulting in unacceptable data loss.

In order to solve the technical problems and unacceptable data loss resulting from conventional manual recovery techniques, the present technology is capable of recovering the primary slice file using one or more dead replica slice files. In some embodiments, the recovery of the primary slice file is an automated process that is capable of recovering data of the primary slice file that is stored within blocks of storage affected by a storage device error. The blocks are recovered using corresponding blocks of one or more dead replica slices files that are programmatically and automatically determined to comprise up-to-date and non-stale data mirrored from the primary slice file to the dead replica slice files. In some embodiments, the distributed metadata layer of the distributed storage architecture is configured to recover the primary slice file using the one or more dead replica slice files.

In some embodiments, recovering the primary slice file involves the evaluation of checksum files for the primary slice file and dead replica slice files in order to identify blocks of the dead replica slice files that comprise up-to-date and non-stale data that can be used to recover blocks of the primary slice file that are corrupted by the storage device error. In particular, the node hosting the primary slice file maintains a primary checksum file for block identifiers within the primary slice file. A hierarchical structure of the primary checksum file and replica checksum files of the replica slice files allows the distributed metadata layer to efficiently and easily compare checksums of block identifiers in the primary slice file to checksums of block identifiers in the replica slice files to determine whether the block identifiers in the replica slice files comprise up-to-date data that can be used to repair the primary slice file or stale data that cannot be used to repair the primary slice file.

In order to determine whether a block storing block identifiers of the primary slice file that has been affected by the storage device error can be recovered using a corresponding block of block identifiers of a dead replica slice file, a checksum of the block and a checksum of the corresponding block are compared to see if the checksums match. In some embodiments, the primary checksum file and a replica checksum file of the dead replica slice file are traversed to identify and compare the checksums to see if the checksums match. Because the storage device error may have only affected the primary slice file and not the checksum files or dead replica slice files, the checksum within the primary checksum file for the block will still be accurate even though the block itself is corrupt. This is because the checksum within the primary checksum file was calculated when the block was initially written to before the storage device error.

If the checksum within the dead replica slice file matches the checksum within the primary slice file, then the data within the corresponding block in the dead secondary slice file is not stale and did not diverge from the primary slice file. That is, because the checksum within the primary checksum file uniquely identifies the non-corrupted data that was stored within the block for the primary slice file before the storage device error (e.g., the checksum is a hash of the non-corrupted data), the data within the corresponding block is the same. The data within the corresponding block is the same because the checksum, uniquely identifying the data within the corresponding block, matches the checksum of the non-corrupted data that was calculated before the storage device error. In this way, data within corresponding blocks of dead replica slice files are used to repair affected/corrupted blocks of the primary slice file based upon the corresponding blocks having checksums matching checksums of the blocks of the primary slice file. Data of the corresponding blocks within the dead replica slice files is used to overwrite the corrupted data within the blocks affected by the storage device error in order to repair the primary slice file with non-stale data from the dead replica slice files. In this way, the primary slice file can be automatically repaired utilizing dead replica slice files using the techniques described herein.

In addition, various embodiments of the present technology provide for a wide range of technical effects, advantages, and/or improvements to computing systems and components. For example, various embodiments may include one or more of the following technical effects, advantages, and/or improvements: 1) non-routine and unconventional techniques for repairing a primary slice file when there are no live replica slice files that would have guaranteed up-to-date data for repairing the primary slice file; 2) repairing the primary slice file using dead replica slice files that are out of sync with the primary slice file; 3) identifying and verifying that data being used to repair the primary slice file from the dead replica slice files only includes up-to-date non-stale data; 4) identifying and excluding/disqualifying data for repairing the primary slice file based upon the data being identified as stale; 5) selectively repairing a primary slice file with data selected from multiple dead replica slice files using a union operation upon checksums; 6) non-routine and unconventional techniques for comparing checksum files of hierarchical checksums (e.g., Merkel checksums) of the primary slice file and dead replica slices files for identifying and verifying that data being used to repair the primary slice file from the dead replica slice files only includes up-to-date non-stale data; and/or 7) improving resiliency to failures (e.g., storage device errors) of a distributed storage architecture by automatically repairing primary slice files affected by the failures without manual intervention.

In the following description, for the purposes of explanation, newer specific details are set forth in order to provide a thorough understanding of embodiments of the present technology. It will be apparent, however, to one skilled in the art that embodiments of the present technology may be practiced without some of the specific details. While, for convenience, embodiments of the present technology are described with reference to nodes, embodiments of the present technology are equally applicable to various other types of hardware, software, and/or storage.

The phrases "in some embodiments," "according to some embodiments," "in the embodiments shown," "in one embodiment," and the like generally mean the particular feature, structure or characteristic following the phrase is included in at least one implementation of the present technology, and may be included in more than one implementation period in addition such phrases do not necessarily refer to the same embodiment or different embodiments.

FIG. 1 is a block diagram illustrating an example of a distributed storage architecture 102 within which a distributed metadata layer 110 is hosted in accordance with an embodiment of the present technology. The distributed storage architecture 102 comprises a plurality of nodes that are configured to manage the storage of data within distributed storage 124. The nodes may include a first node 104, a second node 106, a third node 108, and/or other nodes. The nodes may be implemented as containers within a container orchestration platform (e.g., Kubernetes), serverless threads, servers, virtual machines, etc. The nodes are configured to manage the distributed storage 124. The distributed storage 124 may be composed of a plurality of storage devices that are managed by the nodes. In some embodiments, a single node may manage a single storage device or multiple storage devices. In some embodiments, a storage device may be managed by a single node or may be managed by multiple nodes. In some embodiments, a storage device may be managed by a single node, but is accessible by other nodes that are not managing the storage device. The nodes may store various types of data within the storage devices of the distributed storage 124. In some embodiments, the nodes may store data within a key value store or other data structure that is stored across the storage devices of the distributed storage 124. In this way, the nodes may store data on behalf of clients within the distributed storage 124.

The nodes of the distributed storage architecture 102 may form a control plane layer 109. The control plane layer 109 is configured to implement slice services and block services at each of the nodes of the distributed storage architecture 102 in order to manage the storage of data (e.g., key value pairs) within the distributed storage 124. The control plane layer 109 may host a full operating system with a frontend and a backend storage system. The control plane layer 109 may form a control plane that includes control plane services. The control plane services include a first slice service 112 of the first node 104, a second slice service 116 of the second node 106, the third slice service 120 of the third node 108, and/or other slice services that manage slice files used as indirection layers for accessing data (e.g., key-value pairs) stored on storage devices of the distributed storage 124. The control plane services include a first block service 114 of the first node 104, a second block service 118 of the second node 106, a third block service 122 of the third node 108, and/or other block services that manage block storage of the data (e.g., key-value pairs) in the storage devices of the distributed storage 124. The slice services may be implemented as a distributed metadata layer 110 and the block services may be implemented as a data control plane. A slice service and a block service on a node may communicate with one another on the node and/or may communicate (e.g., through remote procedure calls) with other slice services and block services hosted at other nodes within the distributed storage architecture 102.

In some embodiments, the control plane layer 109 and/or the distributed metadata layer 110 are software layers within the distributed storage architecture 102. The software layers may be comprised of services hosted by the nodes of the distributed storage architecture 102. The services may be executed as applications or other program code within containers or virtual machines of the nodes (e.g., a node may be implemented as a container or a virtual machine used to host the services making up the control plane layer 109 and/or the distributed metadata layer 110). The nodes, containers, and/or virtual machines may be allocated computing resources of the distributed storage architecture for executing the services making up the control plane layer 109 and/or the distributed metadata layer 110 (e.g., compute resources, memory resources, etc.).

In some embodiments, the first node 104 provides a client with access to a storage container. The storage container may comprise a volume, a LUN, or any other storage container through which the client can view, store, and access data. The storage container is used by the first node 104 to abstract away from the client the actual physical storage of data within blocks of the storage devices of the distributed storage 124. Instead of the client managing the physical storage of data, the first slice service 112 and the first block service 114 manage the actual physical storage and management of data within the blocks of the storage devices. In some embodiments, a storage container may have N logical blocks. Each logical block may be 4 kb or any other size. If a logical block is in use and storing data, then the logical block has a block identifier that can be used to identify a block in a storage device of the distributed storage 124 storing the actual data. In some embodiments, the block identifier is a key of a key-value pair within a key-value store. The key can be used to query the key-value store to identify the value of the key-value pair. The value may be the actual physical address of the block storing the data.

In order to track which blocks of physical storage are storing data of which logical blocks of the storage container, the first slice service 112 of the first node 104 maintains a primary slice file 125. The primary slice file 125 is populated with mappings between logical block address of logical blocks to block identifiers used to identify blocks within the storage devices of the distributed storage 124 that are physically storing the data of the logical blocks. In some embodiments, a first mapping may map a logical block address (1) to a block identifier (123). The logical block address (1) corresponds to a first 4 kb logical block of a LUN and the block identifier (123) is a key of a key value pair where the value is a physical address of a particular block within a storage device storing the data of the first 4 kb logical block. A second mapping may map a logical block address (2) to a block identifier (298). The logical block address (2) corresponds to a second 4 kb logical block of the LUN and the block identifier (298) is a key of a key value pair where the value is a physical address of a particular block within a storage device storing the data of the second 4 kb logical block. It may be appreciated that embodiments of slice files and replication of mappings between slice files will be further described in relation to FIGS. 2A-2C.

The first slice service 112 may be configured to replicate changes made to the primary slice file 125 to a first replica slice file 128 maintained by the second slice service 116 as a replica of the primary slice file 125. The first slice service 112 may be configured to replicate changes made to the primary slice file 125 to a second replica slice file 132 maintained by the third slice service 120 as a replica of the primary slice file 125. In some embodiments, the first slice service 112 may generate a new mapping within the primary slice file 125 based upon execution of a write operation. The first slice service 112 replicates the new mapping to one or more replica slice files based upon the first node 104 executing the write operation. The first slice service 112 may also replicate a mapping that is modified or replicate the deletion of a mapping based upon the first node 104 executing delete operations and/or modify operations.

Each block storing data (e.g., block identifiers) replicated to a replica slice file may correspond to a block of the data of the primary slice file 125. In some embodiments, a first block of the primary slice file 125 may store one or more mappings (e.g., block identifiers). A corresponding block of the first replica slice file 128 may store a replica of the one or more mappings of the primary slice file 125 within a different block of storage within the distributed storage 124. A corresponding block of the second replica slice file 132 may store a replica of the one or more mappings of the primary slice file 125 within a different block of storage within the distributed storage 124. The changes may be synchronously replicated to replica slice files when the replica slice files are live replica slice files. As part of synchronous replication, an operation modifying the primary slice file 125 is not responded back to a client as successful until the modification is replicated to one or more live replica slice files. In some embodiments, the changes are not replicated to dead replica slice files that are out-of-sync with the primary slice file 125.

The slice services of the nodes maintain checksum files used to store and organize checksums of block identifiers mapped within slice files. In some embodiments, the first slice service 112 maintains a primary checksum file 126 of checksums for block identifiers within mappings of the primary slice file 125. The second slice service 116 maintains a first replica checksum file 130 of checksums for block identifiers within mappings of the first replica slice file 128. The third slice service 120 maintains a second replica checksum file 134 of checksums for block identifiers within mappings of the second replica slice file 132. In some embodiments, these checksum files are stored within persistent storage available for the distributed metadata layer 110 to access in order to identify and compare checksums of block identifiers for repairing the primary slice file 125. It may be appreciated that embodiments of checksum files will be further described in relation to FIG. 3A.

Figure 2A:
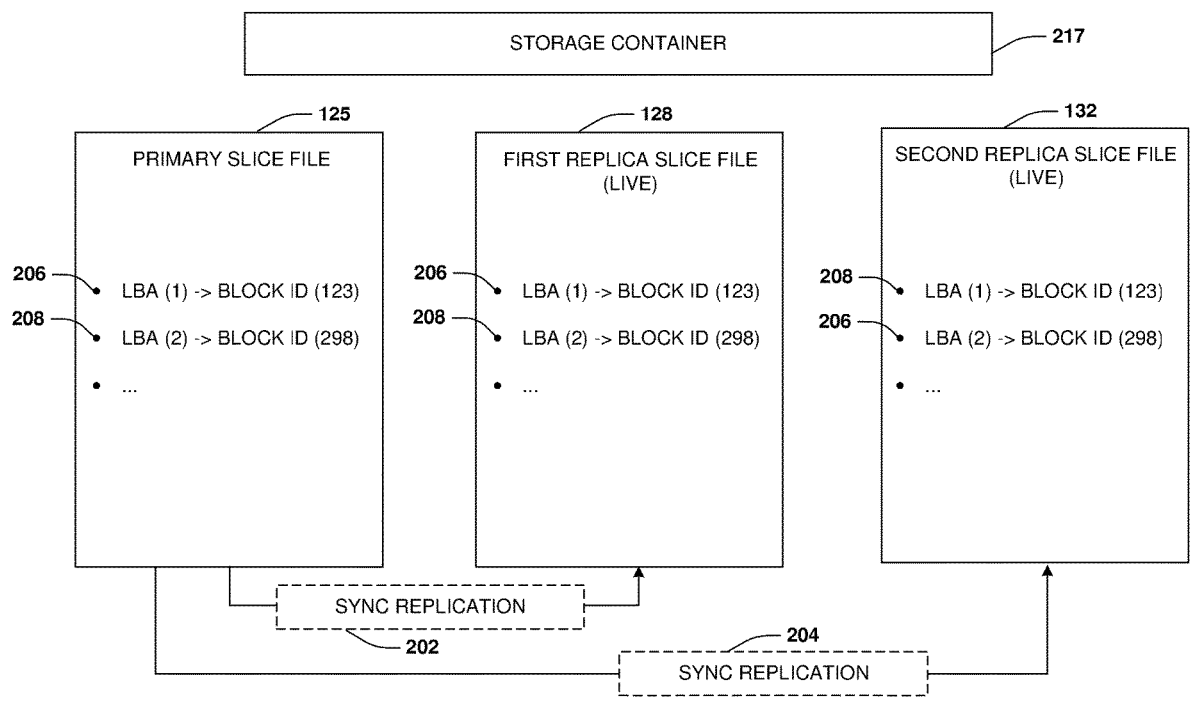
FIG. 2A is a block diagram illustrating an example of performing synchronous replication of changes made to a primary slice file to live replica slice files in accordance with an embodiment of the present technology.

FIG. 2A is a block diagram illustrating an example of performing synchronous replication of changes made to the primary slice file 125 to live replica slice files in accordance with an embodiment of the present technology. The primary slice file 125 may be maintained by the first slice service 112 to map logical block address of logical blocks of a storage container 217 (e.g., addresses of 4 kb logical blocks of client data stored within a volume or LUN) to block identifiers that can be used to locate blocks storing the data of the logical blocks in storage devices of the distributed storage 124.

The first slice service 112 may synchronous replicate changes made to the primary slice file 125 to the live replica slice files that are in a synchronous state and comprise up-to-date data (mapping) that are exact replicas of the data (mappings) of the primary slice file 125. The first replica slice file 128 is designated as a live replica slice file because the first slice service 112 is synchronously replicating 202 changes made to the primary slice file 125 to the first replica slice file 128 such that the first replica slice file 128 mirrors the primary slice file 125. As part of the synchronous replication 202, a first mapping 206, mapping a logical block identifier (1) of a first logical block to a block identifier (123), is replicated from the primary slice file 125 to the first replica slice file 128. Similarly, a second mapping 208, mapping a logical block identifier (2) of a second logical block to a block identifier (298), is replicated from the primary slice file 125 to the first replica slice file 128. In this way, execution of an operation by the first node 104 that changes the primary slice file 125 (e.g., adds a mapping, removes a mapping, changes a mapping, etc.) is synchronously replicated 202 to the second slice service 116 and used to update the first replica slice file 128 before a response is provided back that the operation is complete. Similarly, the second replica slice file 132 is a live replica slice file because the first slice service 112 is synchronously replicating 204 changes made to the primary slice file 125 to the third slice service 120 for updating the second replica slice file 132 to mirror the primary slice file 125.

Figure 2B:
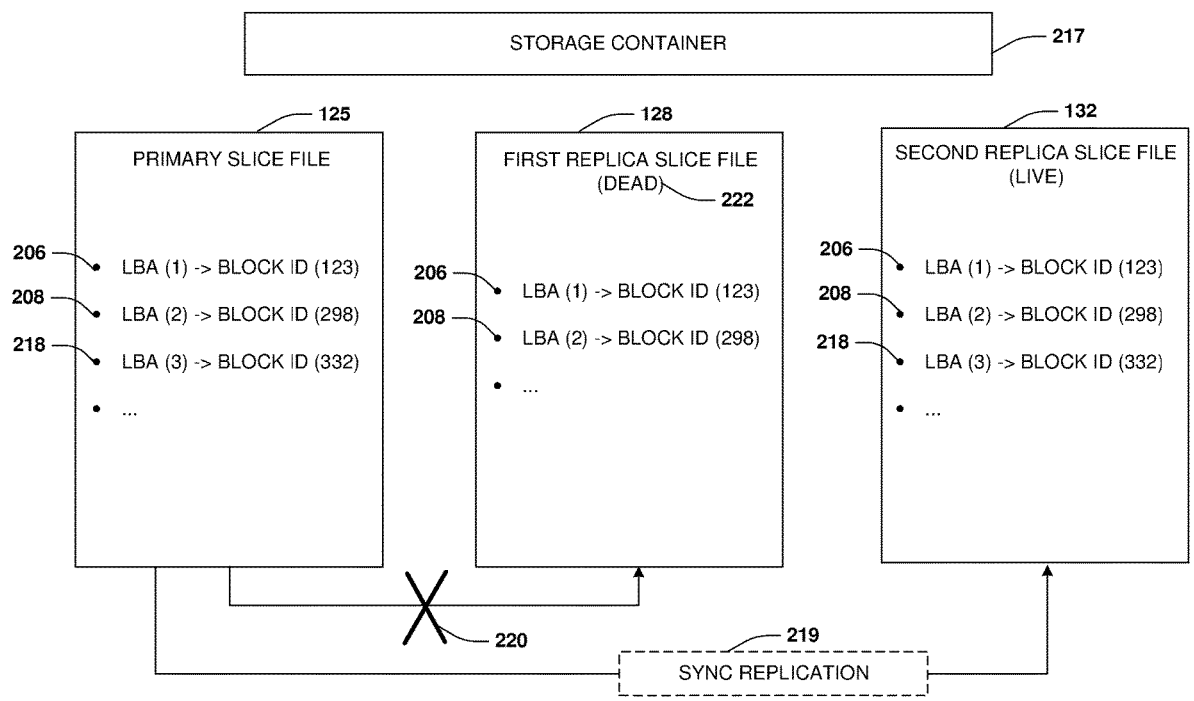
FIG. 2B is a block diagram illustrating an example of performing synchronous replication of changes made to a primary slice file to live replica slice files where a live replica slice file is transitioned to be a dead replica slice file in accordance with an embodiment of the present technology.

FIG. 2B is a block diagram illustrating an example of performing synchronous replication of changes made to a primary slice file to live replica slice files where a live replica slice file is transitioned to be a dead replica slice file in accordance with an embodiment of the present technology. The first node 104 may receive an operation targeting the storage container 217. The operation may be a write operation to write data to a logical block having a logical block address (3) within a LUN. Execution of the operation may involve modifying the primary slice file 125 by creating mapping 218 between the logical block address (3) of the logical block and a block identifier (332) that can be used to locate a block within a storage device of the distributed storage 124 where the first block service 114 will write the data of the write operation. The first slice service 112 may successfully synchronously replicate 219 the mapping 218 to the third slice service 120 that updates the second replica slice file 132. In this way, the second replica slice file 132 is a live replica slice file mirroring the primary slice file 125.

The first slice service 112 may attempt to synchronously replicate the mapping 218 to the second slice service 116. However, the replication of the mapping 218 may fail 220 due to a network failure, the second node 106 not being operational (e.g., having failed or rebooting), a communication failure, etc. Accordingly, the distributed metadata layer 110 marks the first replica slice file 128 as being a first dead replica slice file 222. In particular, the distributed metadata layer 110 may maintain metadata used to track whether replica slice files are live or dead, and thus the distributed metadata layer 110 updates the metadata to indicate that the first replica slice file 128 is dead as the first dead replica slice file 222. The first slice service 112 will no longer replicate changes made to the primary slice file 125 to the first dead replica slice file 222. Thus, the first dead replica slice file 222 will diverge from the primary slice file 125 as the primary slice file 125 is subsequently modified.

Figure 2C:
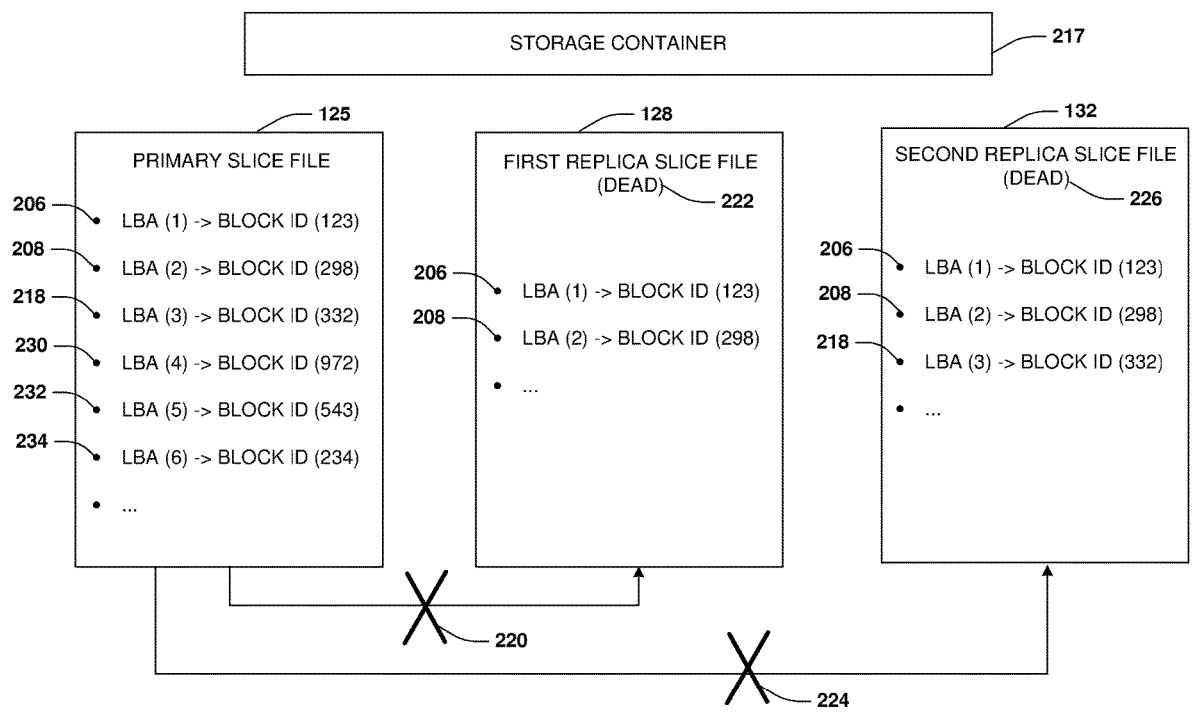
FIG. 2C is a block diagram illustrating an example of transitioning a live replica slice file to be a dead replica slice file in accordance with an embodiment of the present technology.

FIG. 2C is a block diagram illustrating an example of transitioning a live replica slice file to be a dead replica slice file in accordance with an embodiment of the present technology. The first node 104 may receive an operation targeting the storage container 217. The operation may be a write operation to write data to a logical block having a logical block address (4). Execution of the operation may involve modifying the primary slice file 125 by creating mapping 230 between the logical block address (4) of the logical block and a block identifier (972) that can be used to locate a block within a storage device of the distributed storage 124 where the first block service 114 will write the data of the write operation. The first slice service 112 may attempt to synchronously replicate the mapping 230 to the third slice service 120. However, the replication of the mapping 230 may fail 224 due to a network failure, the third node 108 not being operational (e.g., having failed or rebooting), a communication failure, etc. Accordingly, the distributed metadata layer 110 marks the second replica slice file 132 as being a second dead replica slice file 226. In particular, the distributed metadata layer 110 may maintain metadata used to track whether replica slice files are live or dead, and thus the distributed metadata layer 110 updates the metadata to indicate that the second replica slice file 132 is dead as the second dead replica slice file 226. The first slice service 112 will no longer replicate changes made to the primary slice file 125 to the second dead replica slice file 226. Thus, the second dead replica slice file 226 will diverge from the primary slice file 125 as the primary slice file 125 is subsequently modified over time, such as with a mapping 232, a mapping 234, and/or other mappings over time.

Figure 3A:
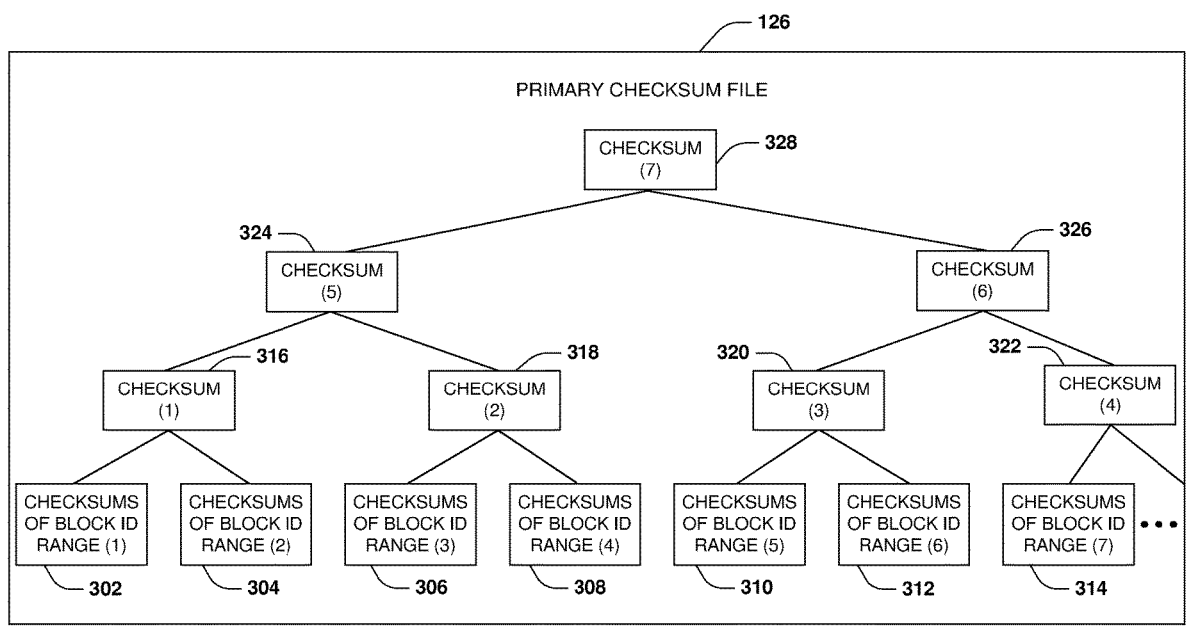
FIG. 3A is a block diagram illustrating an example of a primary checksum file in accordance with an embodiment of the present technology.

FIG. 3A is a block diagram illustrating an example of a primary checksum file 126 in accordance with an embodiment of the present technology. Each slice service may maintain a checksum file for a slice file. In some embodiments, the first slice service 112 maintains the primary checksum file 126 for the primary slice file 125. The primary checksum file 126 is stored within persistent storage and is accessible to nodes and the distributed metadata layer 110 of the distributed storage architecture 102. The primary checksum file 126 comprises checksums arranged according to a hierarchical structure. A first level of the primary checksum file 126 includes checksums of ranges of block identifiers within the primary slice file 125. A range of block identifiers may include a single block identifier or a plurality of block identifiers. In some embodiments, the first level includes checksums 302 of a first range of block identifiers within mappings of the primary slice file 125. The first level includes checksums 304 of a second range of block identifiers within mappings of the primary slice file 125. The first level includes checksums 306 of a third range of block identifiers within mappings of the primary slice file 125. The first level includes checksums 308 of a fourth range of block identifiers within mappings of the primary slice file 125. The first level includes checksums 310 of a fifth range of block identifiers within mappings of the primary slice file 125. The first level includes checksums 312 of a sixth range of block identifiers within mappings of the primary slice file 125. The first level includes checksums 314 of a seventh range of block identifiers within mappings of the primary slice file 125. It may be appreciated that the first level may include any number of checksums for any number of ranges of block identifiers within mappings of the primary slice file 125.

A second level of the primary checksum file 126 is populated with checksums for groups of checksums within the first level of the primary checksum file 126. The second level includes a first checksum 316 that is a checksum of the checksums 302 and the checksums 304 of the first level. The second level includes a second checksum 318 that is a checksum of the checksums 306 and the checksums 308 of the first level. The second level includes a third checksum 320 that is a checksum of the checksums 310 and the checksums 312 of the first level. The second level includes a fourth checksum 322 that is a checksum of the checksums 314 and/or other checksums of the first level.

A third level of the primary checksum file 126 is populated checksums for groups of checksums within the second level of the primary checksum file 126. The third level includes a fifth checksum 324 that is a checksum of the first checksum 316 and the second checksum 318 of the second level. The third level includes a sixth checksum 326 that is a checksum of the third checksum 320 and the fourth checksum 322 of the second level.

A fourth level of the primary checksum file 126 is populated checksums for groups of checksums within the third level of the primary checksum file 126. In this embodiment where the fourth level is a top level of the hierarchical structure, the fourth level includes a seventh checksum 328 that is a checksum of the fifth checksum 324 and the sixth checksum 326 of the third level. It may be appreciated that the primary checksum file 126 may include any number of levels and/or any number of checksums per level.

Figure 3B:
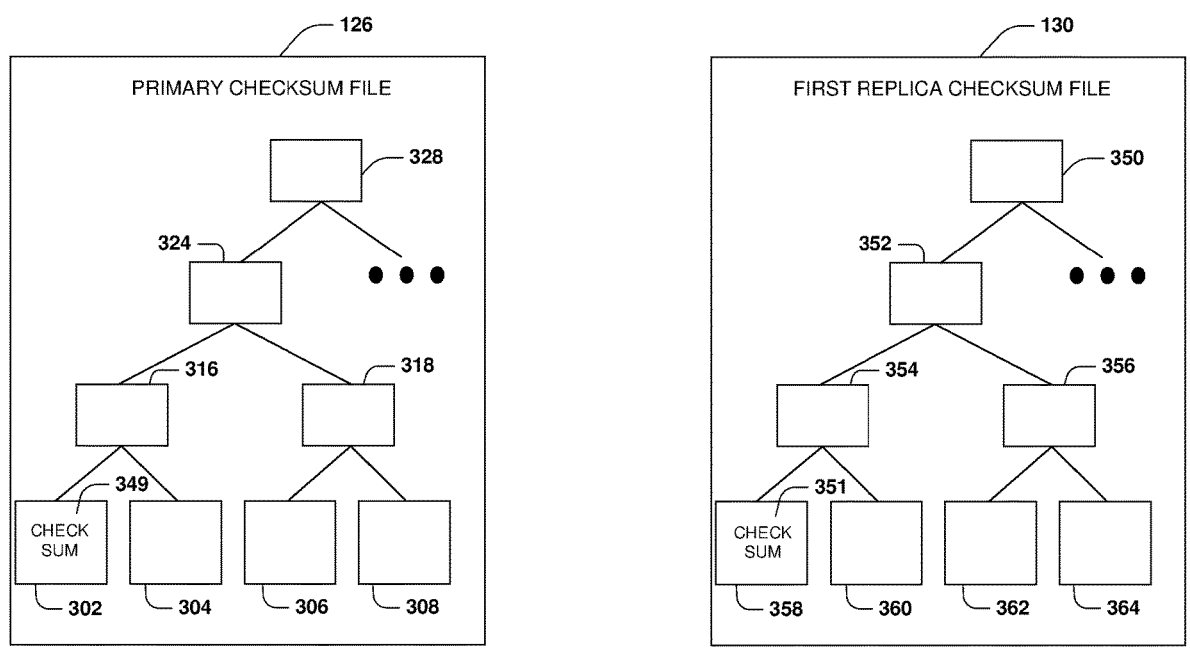
FIG. 3B is a block diagram illustrating an example of comparing checksum files in accordance with an embodiment of the present technology.

FIG. 3B is a block diagram illustrating an example of comparing checksum files in accordance with an embodiment of the present technology. The first replica checksum file 130 comprises checksums arranged according to a hierarchical structure. A first level of the first replica checksum file 130 includes checksums of ranges of block identifiers within the first replica slice file 128. In some embodiments, the first level includes checksums 358 of a first range of block identifiers, checksums 360 of a second range of block identifiers, checksums 364 of a third range of block identifiers, and checksums 364 of a fourth range of block identifiers within mappings of the first replica checksum file 130. A second level of the first replica checksum file 130 is populated with checksums for groups of checksums within the first level of the first replica checksum file 130. The second level includes a checksum 354 of the checksums 358 and the checksums 360 of the first level. The second level includes a checksum 356 of the checksums 362 and the checksums 364 of the first level. A third level of the first replica checksum file 130 is populated checksums for groups of checksums within the second level of the first replica checksum file 130. The third level includes a checksum 352 of the checksum 354 and the second checksum 356 of the second level. A fourth level of the first replica checksum file 130 is populated checksums for groups of checksums within the third level of the first replica checksum file 130. In this embodiment where the fourth level is a top level of the hierarchical structure, the fourth level includes a checksum 350 that is a checksum of the checksum 352 and another checksum (not illustrated) of the third level.

The primary checksum file 126 and first replica checksum file 130 are hierarchical structures that can be traversed to efficiently determine whether block identifiers within the first replica checksum file 130 match block identifiers within the primary slice file 125 (values of the block identifiers before the corruption) for repairing the primary slice file 125. In some embodiments, the primary checksum file 126 and the first replica checksum file 130 are being compared to determine whether a checksum 349 within the first level of the primary checksum file 216 matches a checksum 351 within the first level of the first replica checksum file 130. If the top level checksum (the seventh checksum 328) of the primary checksum file 126 matches a top level checksum (the checksum 350) of a first replica checksum file 130, then the first replica checksum file 130 is an exact replica of the primary checksum file 126. In this way, all checksums within the first replica checksum file 130 will match checksums within the primary checksum file 126. Accordingly, the checksum 351 and the checksum 349 are determined to match without having to traverse down through the checksum files to reach and compare the checksum 351 and the checksum 349.

If the top level checksums do not match, then checksums of the third level of the primary checksum file 126 and the first replica checksum file 350 are compared. For checksums of the third level that match between the primary checksum file 126 and the replica checksum file (e.g., the fifth checksum 324 of the primary checksum file 126 may match the checksum 352 of the first replica checksum file 130), then checksums represented by branches starting from those checksums will match between the primary slice file 125 and the first replica slice file 130. Accordingly, the checksum 351 and the checksum 349 are determined to match without having to traverse down through the checksum files to reach and compare the checksum 351 and the checksum 349. For any mismatches (e.g., the checksum 324 does not match the checksum 352), those branches are further traversed down for further comparison of checksums in order to reach the first level for determining whether the checksum 351 and the checksum 349 match. In this way, the checksum files are an efficient structure for comparing checksums associated with block identifiers of the primary slice file 125 and replica checksum files in order to identify blocks with up-to-date and non-stale block identifiers that can be used to repair the primary slice file 125 based upon matching checksums.

Figure 4:
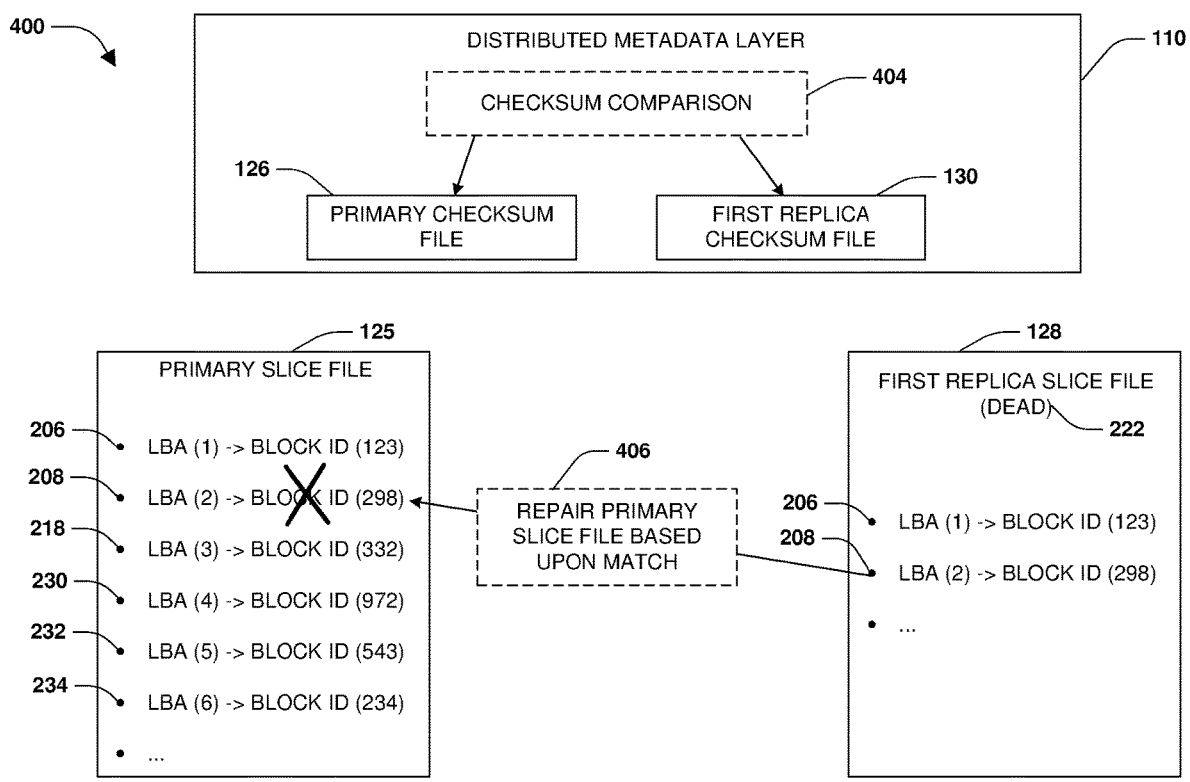
FIG. 4 is a block diagram illustrating an example of a distributed metadata layer repairing a primary slice file in accordance with an embodiment of the present technology.

FIG. 4 is a block diagram illustrating an example of the distributed metadata layer 110 repairing the primary slice file 125 in accordance with an embodiment of the present technology. The distributed metadata layer 110 may detect that a storage device error has occurred. In some embodiments, the distributed metadata layer 110 may receive a notification from a block service of a node that the storage device error has occurred and affected one or more blocks within a storage device of the distributed storage 124. In some embodiments, the storage device error may be detected when accessing one or more blocks within a storage device and determining that calculated checksums for the data currently stored within the one or more blocks does not match checksums stored within a checksum file for the one or more blocks. In some embodiments, the distributed metadata layer 110 may determine that the storage device error affected a block within a storage device of the distributed storage 124 that stores the block identifier (298) of the mapping 208. The storage device error may have corrupted the data within the block, and thus the mapping 208 within the primary slice file 125 is corrupt and unusable. In some embodiments, the block may comprise a plurality of block identifiers of a plurality of mappings within the primary slice file 125 are corrupt and unusable. Accordingly, the distributed metadata layer 110 implements a repair process to repair the primary slice file 125.

As part of the repair process, the distributed metadata layer 110 determines whether any replica slice files are live replica slice files. A live replica slice file mirrors the primary slice file 125 and comprises up-to-date mappings of the primary slice file 125 because changes to the primary slice file 125 are being synchronously replicated to the live replica slice file. Thus, the live replica slice file can be used to repair or replace the primary slice file 125 that has been corrupted due to the storage device error. However, if there are no live replica slice files and there are only dead replica slice files, then the dead replica slice files will have diverged from the primary slice file 125 and may comprise stale or not up-to-date mappings (e.g., the first dead replica slice file 222 is missing mappings 218, 230, 232, 234 that are in the primary slice file 125, and other mappings within the first dead replica slice file 222 could comprise stale information). The distributed metadata layer 110 may evaluate the metadata used to track whether replica slice files are live or dead to determine whether any live replica slice files exist.

In response to the distributed metadata layer 110 detecting that that there are only dead replica slice files, then distributed metadata layer 110 may perform a checksum comparison 404 between checksums of the blocks affected by the storage device error and blocks storing corresponding block identifiers within the dead replica slice files. In some embodiments, the distributed metadata layer 110 determines that a block of a storage device storing the block identifier (298) of the mapping 208 has been corrupted by the storage device error. The distributed metadata layer 110 identifies the first replica slice file 128 as being maintained as a replica of the primary slice file 125 and that the first replica slice file 128 is the first dead replica slice file 222 that is out of sync with the primary slice file 125. Accordingly, the distributed metadata layer 110 executes the checksum comparison 404 upon the primary checksum file 126 and the first replica checksum file 130 to determine whether a checksum for the corrupted block storing the block identifier (298) of the primary slice file 125 matches a checksum for a block storing a corresponding block identifier (298) of the first dead replica slice file 222. The storage device error may have affected storage used to store the primary slice file 125, but not storage used to store the primary checksum file 126, the first replica checksum file 130, and the first dead replica slice file 222. Also, the checksums within the primary checksum file 126 and the first replica checksum file 130 were created when the block identifiers were initially stored and corresponding to non-corrupt data (e.g., the checksum for the now corrupted block is an accurate checksum of the non-corrupted data that was stored within the now corrupted block before the storage device error/corruption).

In some embodiments, the checksum comparison 404 compares the checksum within the primary checksum file 126 for the block identifier (298) of the primary slice file 125 with a checksum for the corresponding block identifier (298) of the first dead replica slice file 222 to determine whether the checksums match. If the checksums match, then the block storing the block identifier (298) of the first dead replica slice file 222 is used to repair 406 (overwrite) the corrupted block of the primary slice file 125. The match indicates that the block of the first dead replica slice file 222 comprises uncorrupted up-to-date data for the block identifier (298). In some embodiments, the primary checksum file 126 and the first replica checksum file 130 may be traversed from a top level down through the hierarchies of checksum files to determine whether the checksums match. If checksums within any level of a branch leading down to the block identifier (298) match (e.g., the fifth checksum 324 or the second checksum 318 where the block identifier (298) is part of the third range of block identifiers), then the checksums for the blocks storing the block identifier (298) are determined to match without having to fully traverse down to the actual checksums for the block identifier (298). If the checksums did not match and there are no other dead replica slice files to evaluate for potentially repairing the primary slice file 125, then an error message may be generated that the block identifier (298) is unrecoverable.

Figure 5:
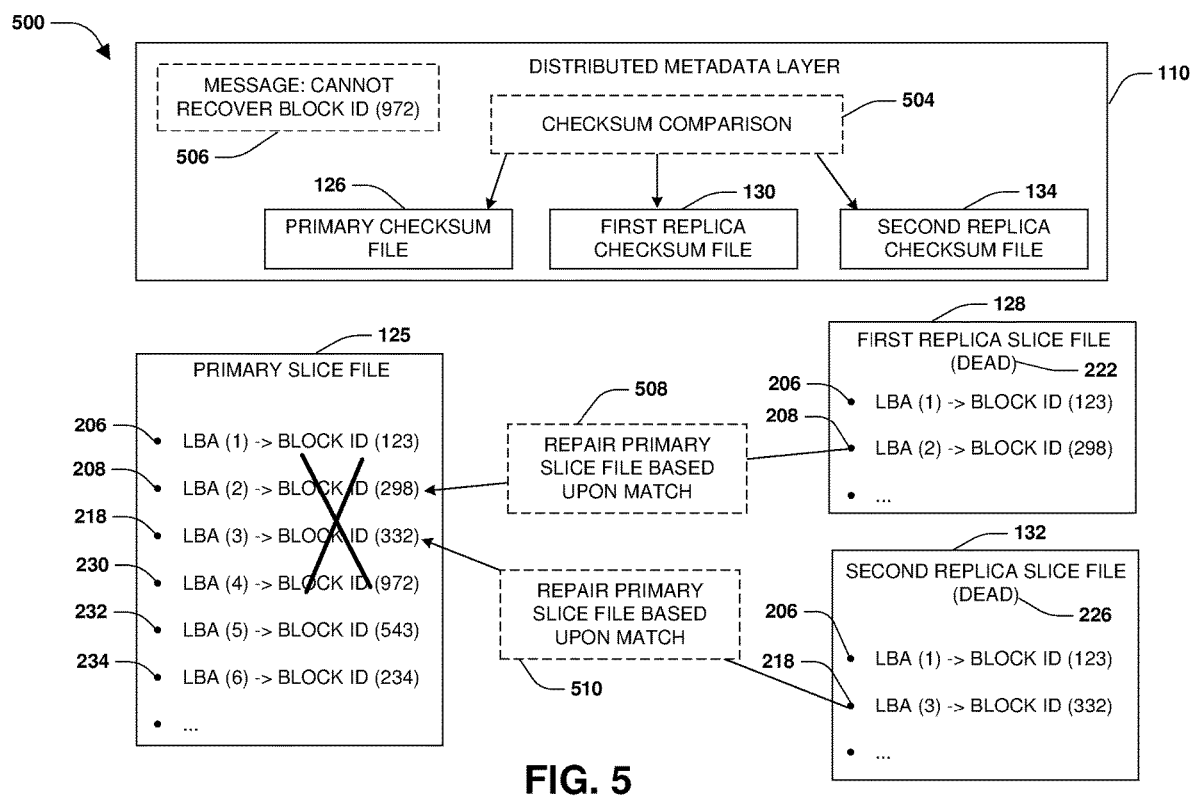
FIG. 5 is a block diagram illustrating an example of a distributed metadata layer repairing a primary slice file in accordance with an embodiment of the present technology.

FIG. 5 is a block diagram illustrating an example of the distributed metadata layer 110 repairing the primary slice file 125 in accordance with an embodiment of the present technology. The distributed metadata layer 110 may determine that a storage device error affected blocks of a storage device that store the block identifier (298) of the mapping 208, the block identifier (332) of the mapping 218, the block identifier (972) of the mapping 230, and/or other block identifiers of other mappings within the primary slice file 125. In response to the distributed metadata layer 110 detecting that that there are only dead replica slice files, the distributed metadata layer 110 may perform a checksum comparison 504 between checksums of the blocks affected by the storage device error and blocks storing corresponding block identifiers within the dead replica slice files. The distributed metadata layer 110 may identify the first dead replica slice file 222 and the second dead replica slice file 226 as dead replica slice files to evaluate for repairing the primary slice file 125. The distributed metadata layer 110 may perform the checksum comparison 504 upon the primary checksum file 126, the first replica checksum file 130, and the second replica checksum file 134 to determine whether checksums for blocks of the primary slice file 125, the first dead replica slice file 222, and the second dead replica slice file 226 storing the block identifiers affected by the storage device error match. In some embodiments, the checksum comparison 504 may perform a union operation upon checksums of the primary slice file 125, the first dead replica slice file 222, and the second dead replica slice file 226 to identify matching checksums.

The checksum comparison 504 may determine that a block storing the block identifier (298) for the first dead replica slice file 222 matches the checksum for the corrupted block storing the block identifier (298) for the primary slice file 125. Accordingly, the distributed metadata layer 110 uses the block to repair 508 (overwrite) the corrupted block. The checksum comparison 504 may determine that a block storing the block identifier (332) for the second dead replica slice file 226 matches the checksum for the corrupted block storing the block identifier (332) for the primary slice file 125. Accordingly, the distributed metadata layer 110 uses the block to repair 510 (overwrite) the corrupted block. The distributed metadata layer 110 may determine that checksums for the block identifier (972) within the first replica checksum file 130 and the second replica checksum file 134 do not match a checksum for the block identifier (972) within the primary checksum file 126. Accordingly, the distributed metadata layer 110 may provide a client with an error message 506 that the block identifier (972) cannot be recovered.

Figure 6:
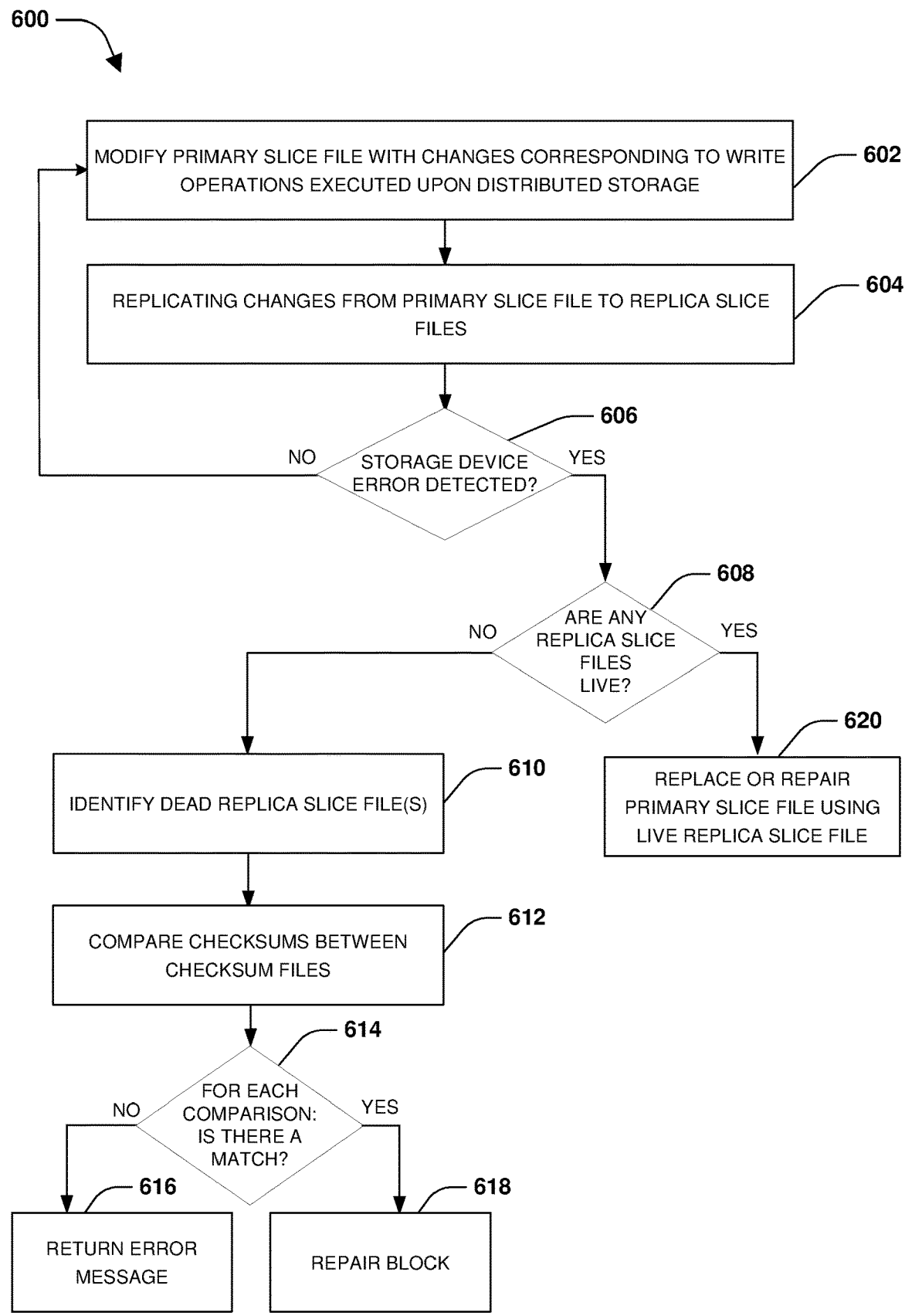
FIG. 6 is a flow chart illustrating an example of a set of operations for repairing a primary slice file in accordance with various embodiments of the present technology.

FIG. 6 is a flow chart illustrating an example of a set of operations for repairing the primary slice file 125 in accordance with various embodiments of the present technology. During operation 602 of method 600, the primary slice file 125 is modified with changes corresponding to write operations executed by the first node 104 upon the distributed storage 124. The primary slice file 125 may be modified by adding, removing, or modifying a mapping between a logical block address of a logical block and a block identifier used to identify a block of a storage device within the distributed storage 124 that stores the data of the logical block.

During operation 604 of method 600, the changes are replicated from the primary slice file 125 to replica slice files that are maintained by other nodes as replicas of the primary slice file 125. In some embodiments, the changes are only replicated to live replica slice files and are not replicated to dead replica slice files. In some embodiments, the changes are replicated to the first replica slice file 128 and the second replica slice file 132 because the first replica slice file 128 and the second replica slice file 132 are live replica slice files. In some embodiments, the changes are synchronously replicated such that the write operations are not responded back to clients as complete until the changes have been successfully replicated to the live replica slice files.

During operation 606 of method 600, the distributed metadata layer 110 monitors for storage device errors. If there are no storage device errors, then operation 602 and operation 604 continue to occur for incoming write operations. If a storage device error affecting one or more blocks storing data (e.g., mappings such as block identifiers) of the primary slice file 125 is detected during operation 606 of method 600, then the distributed metadata layer 110 determines whether any of the replica slice files are live replica slices files, during operation 608 of method 600. In some embodiments, the distributed metadata layer 110 may evaluate metadata used to track whether replica slice files are live or dead. If there is a live replica slice file, then the primary slice file 125 is either replaced or repaired using the live replica slice file, during operation 620 of method 600, since the live replica slice file mirrors the primary slice file 125.

If there are no live replica slice files, then operation 610 of method 600 is performed to identify one or more dead replica slice files that were previously maintained as exact replicas of the primary slice file 125 before being designated as being dead. During operation 612 of method 600, a checksum comparison is performed between checksum files of the primary slice file 125 and the dead replica slice files. In some embodiments, a primary checksum file of the primary slice file 125 is a hierarchical structure where a first level (a lowest level) of the primary checksum file comprises checksums for each block identifier. In some embodiments, a checksum of a block is calculated by a cryptographic hashing function that generates a hash as the checksum using content of the block as an input into the cryptographic hashing function. A second level (a next higher level) of the primary checksum file comprises checksums for groups of checksums within the lowest level (level 1). In some embodiments, the first level may include 1,000 checksums that are 16 byte each. 4 kb byte groupings of the 16 byte checksums may be grouped together, and a checksum is created for each group for inclusion within the second level. A third level of the primary checksum file comprises checksums for groups of checksums within the second level. A fourth level (a highest level) of the primary checksum file comprises a checksum for groups of checksums within the third level. It may be appreciated that a checksum file can include any number of levels, which may be dependent on how many block identifiers are populated within the primary slice file and how checksums are grouped at each level.

In some embodiments, the checksum comparison includes performing a union operation upon checksums of the one or more blocks (e.g., checksums of block identifiers stored within the blocks) affected by the storage device error and checksums of corresponding blocks of the dead replica slice files storing corresponding block identifiers. During operation 614 of method 600, for each comparison (e.g., for each union operation), a determination is made as to whether there is a match. If there is no match for a block affected by the storage device error, then an error message is returned to a client during operation 616 of method 600. If there is a match for a block affected by the storage device error, then the block is repaired (overwritten) by a corresponding block from a dead replica slice file during operation 618 of method 600.

Figure 7A:
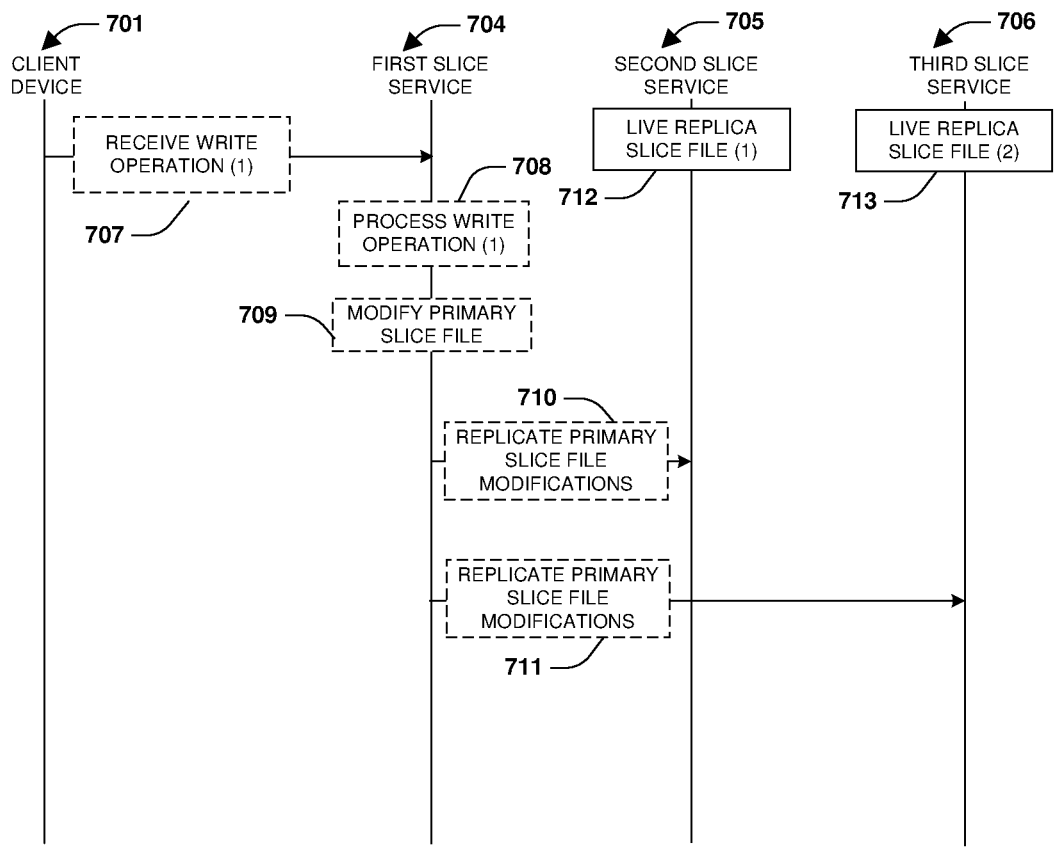
FIG. 7A is a sequence diagram illustrating an example of a set of operations for replicating modifications to a primary slice file in accordance with various embodiments of the present technology.

FIG. 7A is a sequence diagram illustrating an example of a set of operations for replicating modifications to a primary slice file in accordance with various embodiments of the present technology. A first node may host a first slice service 704. The first slice service 704 may store data within a storage device and/or other storage devices of a distributed storage architecture. The first slice service 704 may use a primary slice file, stored within the storage device, to track logical blocks of data stored by nodes of the distributed storage architecture. Other slices services hosted by other nodes of the distributed storage architecture may store replicas of the primary slice file. A second slice service 705 may host a first replica slice file 712, a third slice service 706 may host a second replica slice file 713, and/or other slice services may host other replica slice files maintained as replicas of the primary slice file. While the first slice service 704 can actively replicate modifications made to the primary slice file to the replica slice files, then the replica slice files are designated as live replica slice files. If there is a failure to replicate a modification made to the primary slice file to a particular replica slice file, then the replica slice file is transitioned to be a dead replica slice file.

The first slice service 704 may be configured to process I/O operations received from client devices. The first slice service 704 may receive 707 a first write operation from a client device 701. The first slice service 704 may process 708 the first write operation by writing data to blocks of storage within the storage device and/or other storage devices of the distributed storage architecture. The data may be written to blocks having block identifiers, and the data may be referenced using logical blocks having logical block addresses. As part of processing 708 the first write operation, the first slice service 704 modifies 709 the primary slice file with mappings between the logical block addresses and the block identifiers. The first slice service 704 successfully replicates 710 the modifications made to the primary slice file to the first replica slice file 712. The first slice service 704 successfully replicates 711 the modifications made to the primary slice file to the second replica slice file 713.

Figure 7B:
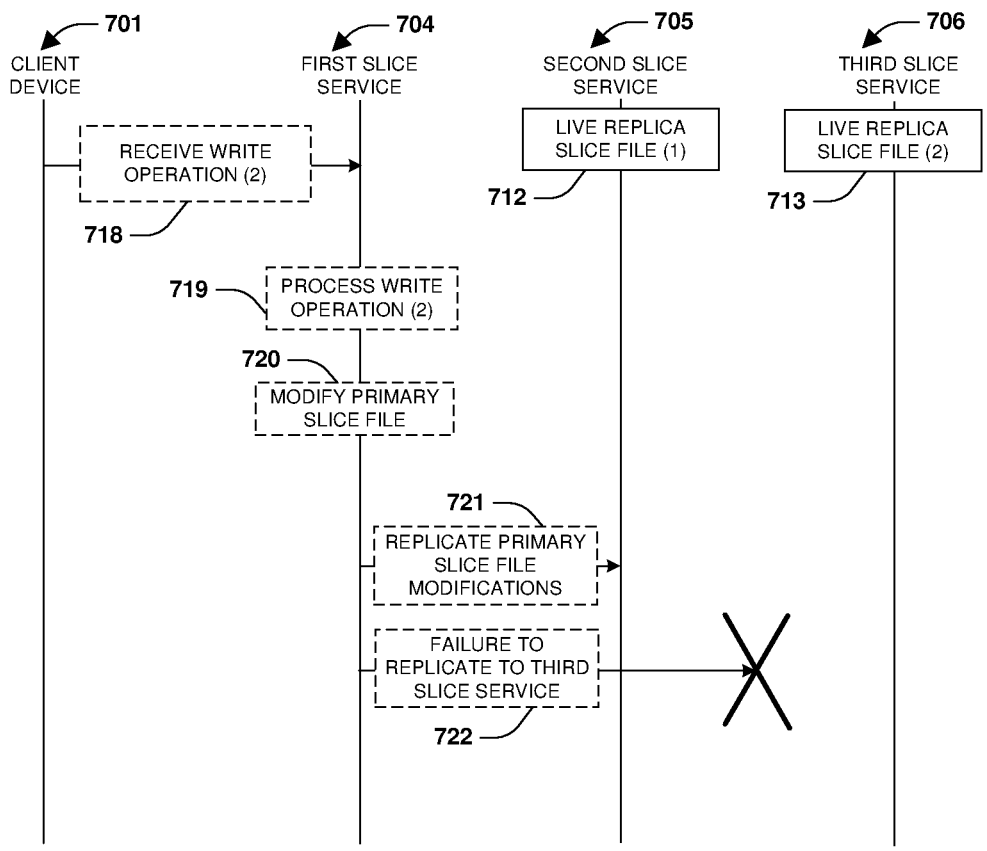
FIG. 7B is a sequence diagram illustrating an example of a set of operations for replicating modifications to a primary slice file in accordance with various embodiments of the present technology.
Figure 7C:
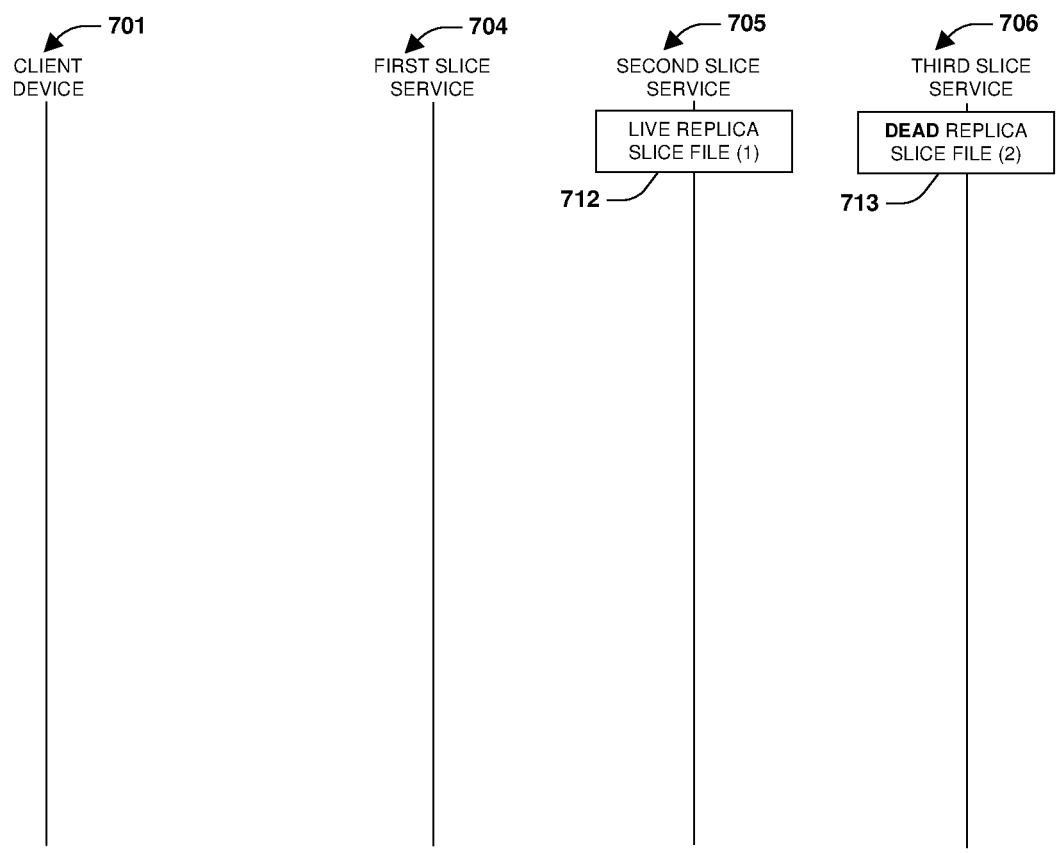
FIG. 7C is a sequence diagram illustrating an example of a set of operations for transitioning a replica slice file to be a dead replica slice file in accordance with various embodiments of the present technology.

The first slice service 704 may receive 718 a second write operation from the client device 701, as illustrated by FIG. 7B depicting a sequence diagram illustrating an example of a set of operations for replicating modifications to the primary slice file in accordance with various embodiments of the present technology. The first slice service 704 may process 719 the second write operation by writing data to blocks of storage within the storage device and/or other storage devices of the distributed storage architecture. The data may be written to blocks having block identifiers, and the data may be referenced using logical blocks having logical block addresses. As part of processing 719 the second write operation, the first slice service 704 modifies 720 the primary slice file with mappings between the logical block addresses and the block identifiers. The first slice service 704 successfully replicates 721 the modifications made to the primary slice file to the first replica slice file 712. However, the first slice service 704 fails 722 to replicate the modifications made to the primary slice file to the second replica slice file 713. Accordingly, the second replica slice file 713 is transitioned to be a dead replica slice file, as illustrated by FIG. 7C depicting a sequence diagram illustrating an example of a set of operations for transitioning a replica slice file to be a dead replica slice file in accordance with various embodiments of the present technology.

Figure 7D:
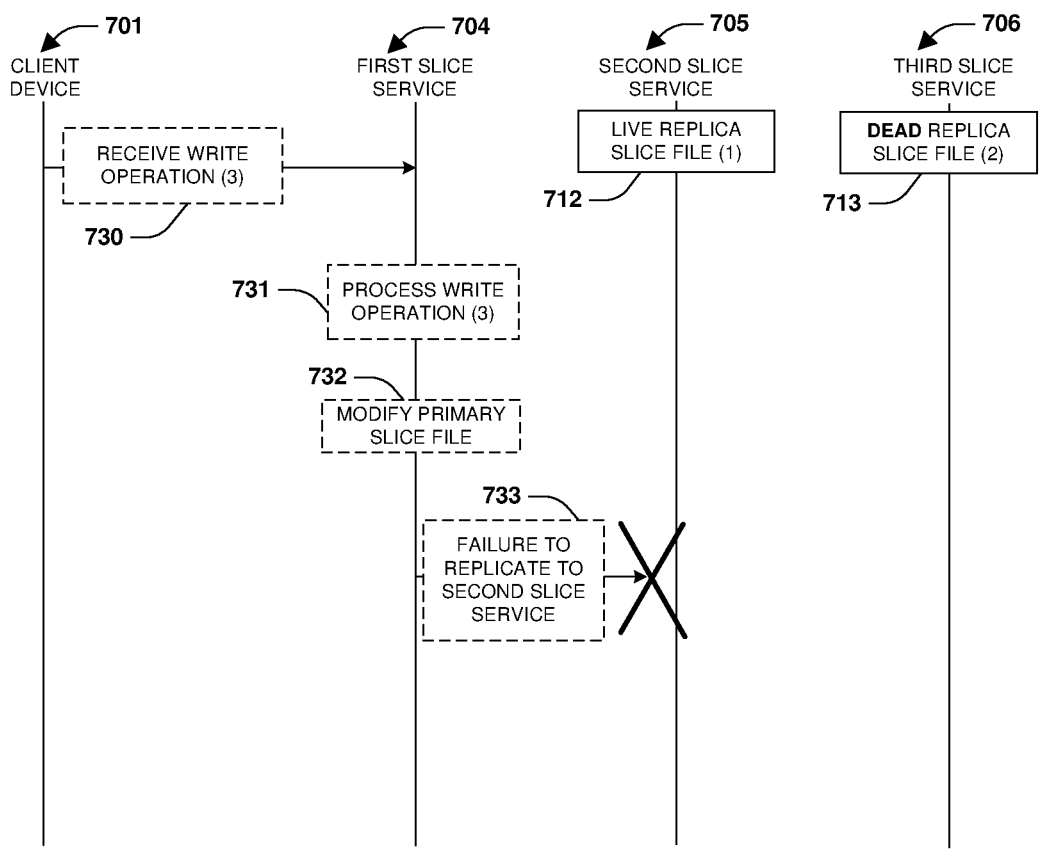
FIG. 7D is a sequence diagram illustrating an example of a set of operations for replicating modifications to a primary slice file in accordance with various embodiments of the present technology.
Figure 7E:
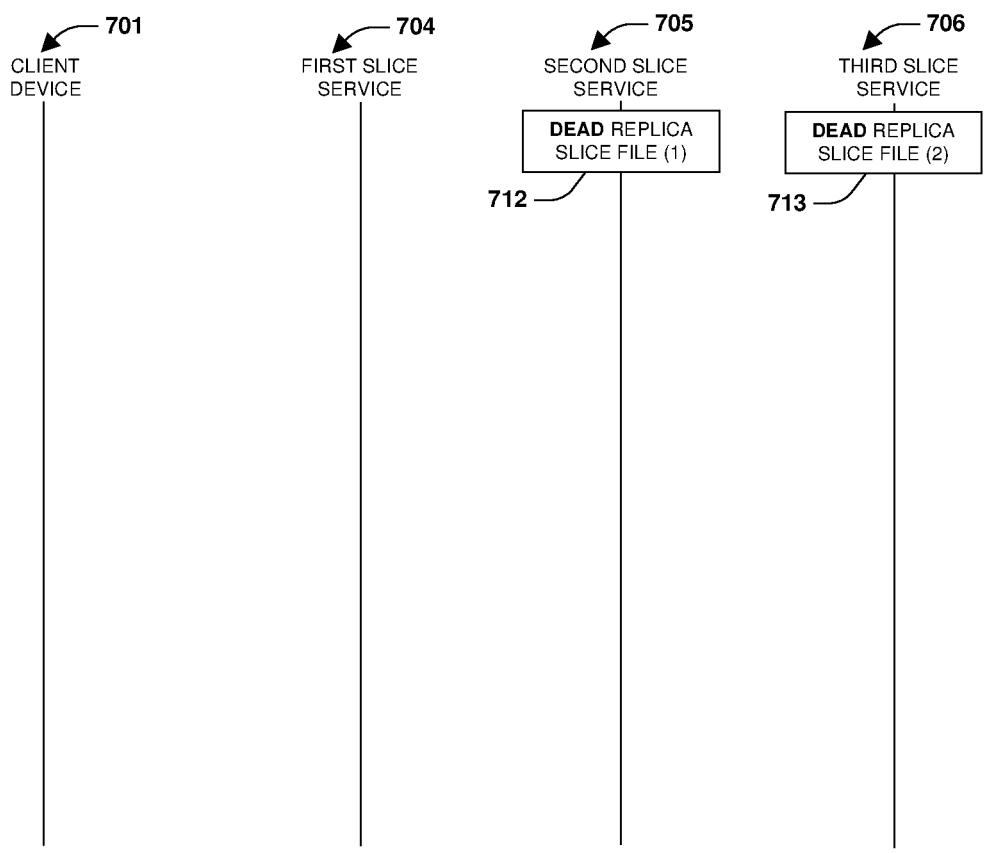
FIG. 7E is a sequence diagram illustrating an example of a set of operations for transitioning a replica slice file to be a dead replica slice file in accordance with various embodiments of the present technology.

The first slice service 704 may receive 730 a third write operation from the client device 701, as illustrated by FIG. 7D depicting a sequence diagram illustrating an example of a set of operations for replicating modifications to the primary slice file in accordance with various embodiments of the present technology. The first slice service 704 may process 731 the third write operation by writing data to blocks of storage within the storage device and/or other storage devices of the distributed storage architecture. The data may be written to blocks having block identifiers, and the data may be referenced using logical blocks having logical block addresses. As part of processing 731 the third write operation, the first slice service 704 modifies 732 the primary slice file with mappings between the logical block addresses and the block identifiers. The first slice service 704 fails 733 to replicate the modifications made to the primary slice file to the first replica slice file 712. Accordingly, the first replica slice file 712 is transitioned to be a dead replica slice file, as illustrated by FIG. 7E depicting a sequence diagram illustrating an example of a set of operations for transitioning a replica slice file to be a dead replica slice file in accordance with various embodiments of the present technology.

Figure 7F:
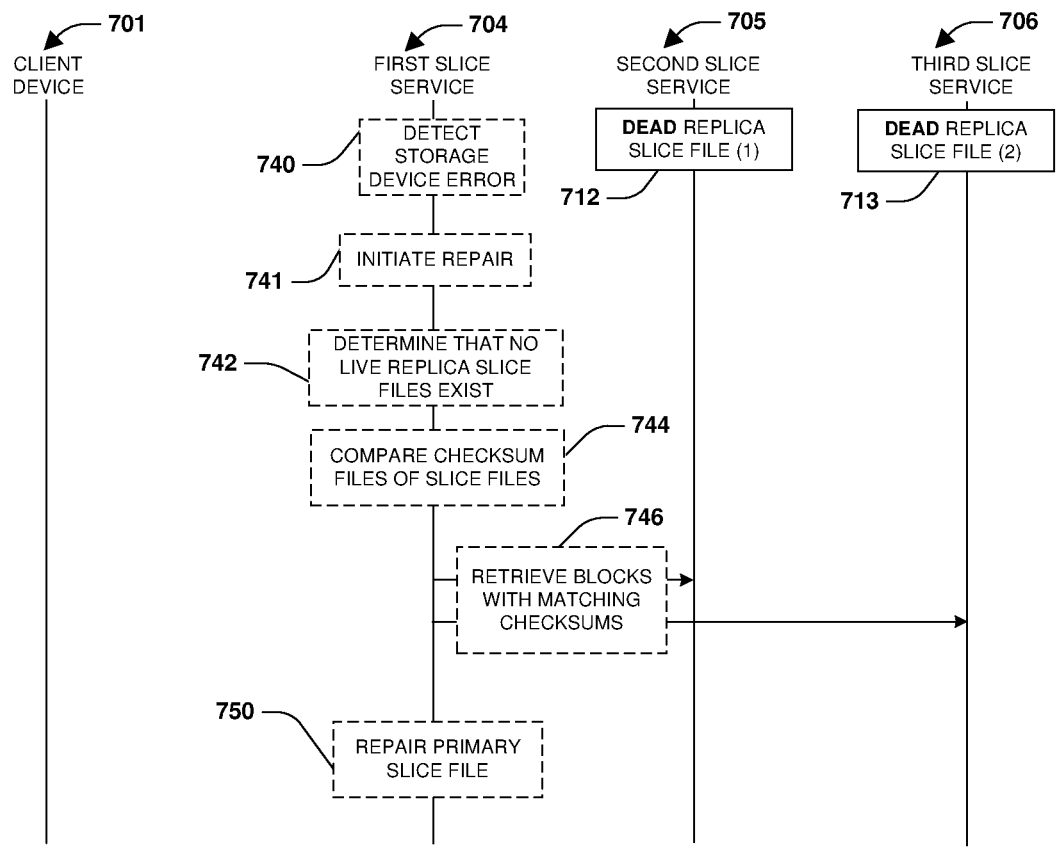
FIG. 7F is a sequence diagram illustrating an example of a set of operations for repairing a primary slice file in accordance with various embodiments of the present technology.

The first slice service 704 may detect 740 a storage device error affecting one or more blocks within the storage device used to store the primary slice file, as illustrated by FIG. 7F depicting a sequence diagram illustrating an example of a set of operations for repairing the primary slice file in accordance with various embodiments of the present technology. The storage device error may have corrupted data within the one or more blocks storing a plurality of block identifiers of a plurality of mappings within the primary slice file. Accordingly, the first slice service 704 initiates 741 a repair process to repair the primary slice file. The first slice service 704 may determine 742 that there are no live replica slice files and that all replica slice files are dead replica slice files. The first slice service 704 compares 744 checksums of the one or more blocks affected by the storage device error with checksums of corresponding blocks within the dead replica slice files to determine whether the checksums match. The first slice service 704 retrieves 746 blocks with matching checksums from the dead replica slice files, such as from the first replica slice file 712 and/or the second replica slice file 713. The first slice service 704 repairs 750 the primary slice using the retrieved blocks.

Figure 8:
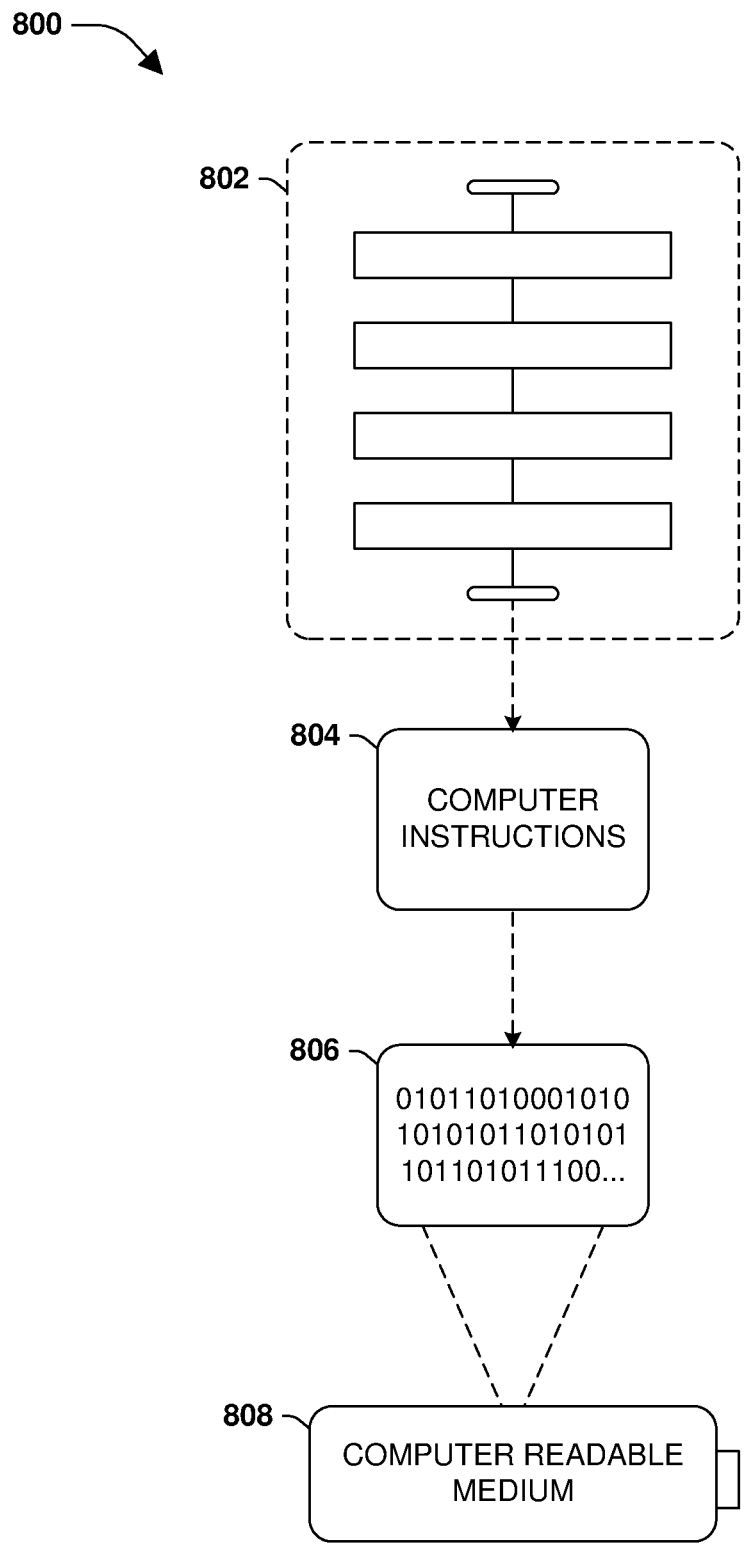
FIG. 8 is an example of a computer readable medium in which various embodiments of the present technology may be implemented.

FIG. 8 is an example of a computer readable medium 800 in which various embodiments of the present technology may be implemented. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. The computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform at least some of the exemplary methods 802 disclosed herein, such as method 600 of FIG. 6, for example. In some embodiments, the processor-executable computer instructions 804 are configured to implement a system, such as at least some of the exemplary systems disclosed herein, such as system 100 of FIG. 1, system 400 of FIG. 4, and/or system 500 of FIG. 5, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:
   a distributed storage architecture including distributed storage comprised of storage devices managed by a plurality of nodes including a first node and a second node;
   the first node hosting a first slice service that maintains a primary slice file populated with mappings between logical block addresses of logical blocks of a storage container within the distributed storage to block identifiers used to identify blocks within the storage devices storing data of the logical blocks, wherein the first slice service replicates changes made to the primary slice file to a first replica slice file maintained by a second slice service of the second node as a replica of the primary slice file, and wherein a second block of the first replica slice file is maintained as a replica of a first block of the primary slice file; and
   a distributed metadata layer hosted across the plurality of nodes, wherein the distributed metadata layer includes the first slice service and the second slice service, and wherein the distributed metadata layer:
   detects a storage device error affecting the first block storing a first block identifier of the primary slice file;
   in response to detecting that the first replica slice file is a first dead replica slice file that is out of sync with the primary slice file, compares a first checksum of the first block with a second checksum of the second block storing a second block identifier of the first dead replica slice file to determine whether the first checksum and the second checksum match; and
   in response to the first checksum and the second checksum matching, overwrites the first block with the second block to repair the primary slice file.

2. The system of claim 1, wherein the distributed metadata layer:
   in response to the first checksum and the second checksum not matching, determines whether there are additional dead replica slice files maintained by slice services of the plurality of nodes; and
   in response to determining that there are no additional dead replica slice files, generates an error message that block identifiers stored within the first block are unrecoverable.

3. The system of claim 1, wherein the distributed metadata layer:
   in response to the first checksum and the second checksum not matching, determines whether there are additional dead replica slice files maintained by slice services of the plurality of nodes; and
   in response to determining that a third slice service of a third node maintains a second dead replica slice file:
   compares the first checksum of the first block with a third checksum of a third block storing a third block identifier of the second dead replica slice file to determine whether the first checksum and the third checksum match; and
   in response to the first checksum and the third checksum matching, overwrites the first block with the third block to repair the primary slice file.

4. The system of claim 1, wherein the distributed metadata layer:
   in response to the first checksum and the second checksum matching, determines that the second block identifier comprising uncorrupted replicated data for the first block identifier; and
   stores the second block identifier into the first block.

5. The system of claim 1, wherein the first block stores a first plurality of block identifiers corrupted based upon the storage device error, and wherein the distributed metadata layer:
   in response to the first checksum and the second checksum matching, determines that a second plurality of block identifiers stored within the second block comprise non-corrupted data for the first plurality of block identifiers; and
   overwrites corrupt data of the first plurality of block identifiers within the first block with data of the second plurality of block identifiers within the second block.

6. The system of claim 1, wherein the distributed metadata layer:
   determines that the storage device error affects a first plurality of blocks storing a first plurality of block identifiers of the primary slice file;
   compares a first plurality of checksums for the first plurality of blocks with a second plurality of checksums for a second plurality of blocks of the first replica slice file to identify matching checksums, wherein the second plurality of blocks are maintained as replicas of the first plurality of blocks; and
   in response to identifying one or more matches, overwrites blocks of the first plurality of blocks with corresponding blocks of the second plurality of blocks based upon checksums of the corresponding blocks matching checksums of the blocks of the first plurality of blocks.

7. The system of claim 1, wherein the distributed metadata layer:
   populates a checksum file with checksums of block identifiers stored within the primary slice file, wherein the checksums are arranged according to a hierarchical structure where a first level of checksums correspond to checksums of groups of block identifiers within the primary slice file, a second level of checksums correspond to checksums of the checksums within the first level of checksums, and a third level of checksums correspond to checksums of the checksums of the second level of checksums.

8. The system of claim 1, wherein the distributed metadata layer:
   populates a checksum file stored within persistent storage of the distributed storage architecture with checksums of block identifiers stored within the primary slice file, wherein the checksums are arranged according to a hierarchical structure where a first level of checksums correspond to checksums of groups of block identifiers within the primary slice file, a second level of checksums correspond to checksums of the checksums within the first level of checksums, and a third level of checksums correspond to checksums of the checksums of the second level of checksums, wherein the checksum file is traversed to access the first checksum of the first block for comparison with the second checksum.

9. The system of claim 1, wherein the distributed metadata layer:
   determines that the storage device error affects a first plurality of blocks storing a first plurality of block identifiers of the primary slice file;
   identifies a plurality of dead replica slice files maintained as replicas of the primary slice file by a plurality of slice services;
   compares checksums of the first plurality of blocks with checksums of corresponding blocks storing block identifiers of the plurality of dead replica slice files; and
   repairs the primary slice file by overwriting blocks of the first plurality of blocks with corresponding blocks of the plurality of dead replica slice files based upon checksums of the corresponding blocks matching checksums of the first plurality of blocks.

10. The system of claim 9, wherein the distributed metadata layer overwrites a first subset of the first plurality of blocks with one or more blocks from the first replica slice file and a second subset of the first plurality or blocks with one or more blocks from a second replica slice file.

11. The system of claim 9, where the distributed metadata layer performs a union operation between the checksums of the first plurality of blocks and the checksums of corresponding blocks storing the block identifiers of the plurality of dead replica slice files.

12. The system of claim 1, wherein the distributed metadata layer:
   maintains the first replica slice file as a first live replica slice file based upon the changes to the primary slice file being synchronously replicated to the first replica slice file; and
   in response to the first slice service failing to synchronously replicate a change to the first replica slice file, transitions the first replica slice file from being the first live replica slice file to being the first dead replica slice file.

13. A method, comprising:
   modifying a primary slice file, maintained by a first slice service of a first node, with changes corresponding to write operations executed upon distributed storage of a distributed storage architecture, wherein the distributed storage is composed of storage device managed by plurality of nodes including the first node and a second node;
   replicating the changes to a first replica slice file maintained by a second slice service of the second node as a replica of the primary slice file, wherein a second block of the first replica slice file is maintained as a replica of a first block of the primary slice file;
   determining that the first block storing a first block identifier of the primary slice file is affected by a storage device error;
   in response to detecting that the first replica slice file is a first dead replica slice file that has fallen out of sync with the primary slice file, comparing a first checksum of the first block with a second checksum of the second block storing a second block identifier of the first dead replica slice file to determine whether the first checksum and the second checksum match; and
   in response to the first checksum and the second checksum matching, overwriting the first block with the second block to repair the primary slice file.

14. The method of claim 13, further comprising:
   in response to a first plurality of blocks storing a first plurality of block identifiers of the primary slice file being corrupted, comparing a first plurality of checksums for a first plurality of blocks with a second plurality of checksums for a second plurality of blocks of the first replica slice file to identify matching checksums, wherein the second plurality of blocks are maintained as replicas of the first plurality of blocks; and in response to identifying one or more matches, overwriting blocks of the first plurality of blocks with corresponding blocks of the second plurality of blocks based upon checksums of the corresponding blocks matching checksums of the blocks of the first plurality of blocks.

15. The method of claim 13, wherein the first block stores a first plurality of block identifiers corrupted based upon the storage device error, and wherein the method further comprises:

determining that a second plurality of block identifiers stored within the second block comprise non-corrupted data for the first plurality of block identifiers based upon the first checksum matching the second checksum and overwriting corrupt data of the first plurality of block identifiers within the first block with data of the second plurality of block identifiers within the second block.

16. The method of claim 13, further comprising:

determining that the storage device error affects a first plurality of blocks storing a first plurality of block identifiers of the primary slice file;

identifying a plurality of dead replica slice files maintained as replicas of the primary slice file by a plurality of slice services;

comparing checksums of the first plurality of blocks with checksums of corresponding blocks storing block identifiers of the plurality of dead replica slice files; and repairing the primary slice file by overwriting blocks of the first plurality of blocks with corresponding blocks of the plurality of dead replica slice files based upon checksums of the corresponding blocks matching checksums of the first plurality of blocks.

17. The method of claim 16, wherein the repairing further comprises:

overwriting a first subset of the first plurality of blocks with one or more blocks from the first replica slice file and a second subset of the first plurality or blocks with one or more blocks from a second replica slice file.

18. The method of claim 16, wherein the comparing checksums of the first plurality of blocks further comprises:

performing a union operation between the checksums of the first plurality of blocks and the checksums of corresponding blocks storing the block identifiers of the plurality of dead replica slice files.

19. A non-transitory machine readable medium comprising instructions, which when executed by a machine, causes the machine to:

replicate changes made to a primary slice file, maintained by a first slice service of a first node, to a first replica slice file maintained by a second slice service of a second node as a replica of the primary slice file, wherein a second block of the first replica slice file is maintained as a replica of a first block of the primary slice file;

in response to determining that the first block storing a first block identifier of the primary slice file is affected by a storage device error and that the first replica slice file is a first dead replica slice file that has fallen out of sync with the primary slice file, compare a first checksum of the first block with a second checksum of the second block storing a second block identifier of the first dead replica slice file to determine whether the first checksum and the second checksum match; and in response to the first checksum and the second checksum matching, overwrite the first block with the second block to repair the primary slice file.

20. The non-transitory machine readable medium of claim 19, wherein the first checksum and the second checksum comprise Merkel checksums, and wherein the instructions cause the machine to:

populates a checksum file, stored within persistent storage, with Merkel checksums of block identifiers stored within the primary slice file, wherein the Merkel checksums are arranged according to a hierarchical structure where a first level of Merkel checksums correspond to Merkel checksums of groups of block identifiers within the primary slice file and a second level of Merkel checksums correspond to Merkel checksums of the Merkel checksums within the first level of Merkel checksums.

\* \* \* \* \*